(12) United States Patent
Ahmed et al.

(10) Patent No.: US 7,096,672 B1
(45) Date of Patent: Aug. 29, 2006

(54) FLUID HEATING AND GAS TURBINE INTEGRATION METHOD

(75) Inventors: M. Mushtaq Ahmed, Pittsford, NY (US); Raymond Francis Drnevich, Clarence Center, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 11/376,110

(22) Filed: Mar. 16, 2006

Related U.S. Application Data

(62) Division of application No. 11/290,531, filed on Dec. 1, 2005, now Pat. No. 7,043,923, which is a division of application No. 10/654,933, filed on Sep. 5, 2003.

(51) Int. Cl.
*F02C 6/10* (2006.01)

(52) U.S. Cl. .......................................... 60/780; 60/783
(58) Field of Classification Search ............... 60/39.12, 60/780, 781, 783
See application file for complete search history.

(56) References Cited

U.S. PATENT DOCUMENTS

| | | | |
|---|---|---|---|
| 4,733,528 A | 3/1988 | Pinto | 60/39.12 |
| 4,784,069 A | 11/1988 | Stark | 110/211 |
| 5,705,916 A | 1/1998 | Rudbeck et al. | 322/2 |
| 5,896,738 A * | 4/1999 | Yang et al. | 60/780 |
| 6,200,128 B1 | 3/2001 | Kobayashi | 431/5 |
| 6,269,625 B1 | 8/2001 | Dibble et al. | 60/39.06 |
| 6,338,239 B1 * | 1/2002 | Hirata et al. | 60/780 |

OTHER PUBLICATIONS

Welty, "Engineering Heat Transfer", John Wiley & Sons (1974) pp. 11, 13-14.
Shalice, "Gas Turbine Integration to Reduce Energy Costs", AICHE Spring National Meeting (1985).
Cooke et al., "Cogenerative, Direct Exhaust Integration of Gas Turbines in Ethylene Production", Journal of Engineering for Gas Turbines and Power, vol 113 (1991) pp. 212-220.
"Alternative Control Techniques Document—Nox Emissions from Process Heaters" (Revised), U.S. Environmental Protection Agency (1993) Section 3.

* cited by examiner

*Primary Examiner*—Louis J. Casaregola
(74) *Attorney, Agent, or Firm*—David M. Rosenblum

(57) ABSTRACT

A method of heating a fluid in a fluid heater integrated with a gas turbine. Fuel is burned in a radiant section of the fluid heater to heat the fluid and to produce combustion gases for the heating a downstream convective section. The combustion is supported by a combined oxidant stream. An oxygen containing stream or the combined stream, which is made up in part by the oxygen containing stream is preheated through indirect heat transfer with a first gas turbine exhaust stream produced by the gas turbine. A second gas turbine exhaust stream, also produced by the gas turbine is combined with the oxygen containing stream to form the combined oxidant stream. As such, the available heat energy supplied to the fluid heater is supplied not only by the combustion but also the gas turbine. This allows for the fuel to be conserved or for increased fluid throughput.

5 Claims, 4 Drawing Sheets

FLUID HEATING AND GAS TURBINE INTEGRATION METHOD

RELATED APPLICATIONS

This application is a divisional of corresponding prior U.S. application Ser. No. 11/290,531 filed Dec. 1, 2005 now U.S. Pat. No. 7,043,923 that is a divisional of application Ser. No. 10/654,933, filed Sep. 5, 2003.

FIELD OF THE INVENTION

The present invention relates to a method of heating a fluid in a fluid heating device that is integrated with a gas turbine. More particularly, the present invention relates to such a method in which the heat necessary to heat the fluid is produced by combustion of a fuel within the fluid heating device and heat produced by the gas turbine. Even more particularly, the present invention relates to such a method in which an oxygen containing stream is preheated by a first gas turbine exhaust stream and the combustion of the fuel is supported by a combined oxidant stream made up of the preheated oxygen containing stream and a second gas turbine exhaust stream.

BACKGROUND OF THE INVENTION

Fluids are heated in a variety of heating devices by heat generated through the combustion of a fuel. Such heating devices may have as their sole object the heating of the fluid itself such as in a boiler used to heat water to steam or as a reactor in which the heating of the fluid is necessary to support a reaction. A common reactor where such fluid heating is necessary is a steam methane reformer in which the fluid to be heated is a mixture of steam and hydrocarbons that is heated within passages filled with catalyst, to react and thereby form a synthesis gas.

Very often gas turbines exist in installations that have boilers, steam methane reformers, and/or other fluid heating devices. As may be appreciated, a gas turbine exhaust is a high temperature stream that can be advantageously used to augment the heating requirements of the fluid heating device to thereby lower fuel usage. However, in retrofit scenarios that involve replacing existing combustion air for steam methane reformers or fired heaters with gas turbine exhaust, several challenges are presented due to differences in oxygen content, temperature, pressure and flow rate in the gas turbine exhaust as compared with those of air. As will be discussed, addressing such challenges add to the expense involved in the integration which may make the integration unattractive in the first instance.

For instance, U.S. Pat. No. 4,784,069 discloses an air preheater to heat combustion air against gas turbine exhaust and thereby supply the heated air for combusting fuels in a radiant section of a steam methane reformer. This apparatus further includes a bypass around the air preheater to supply excess gas turbine exhaust to the convective section of the reformer for combusting fuel and/or for recovering heat. The degree to which fuel savings may be realized depends on the efficiency of the air preheater and its ability to transfer heat from the gas turbine exhaust to the incoming air. The fabrication costs of preheaters, however, increase with their efficiency. Therefore, the more fuel to be saved, the higher the acquisition cost for the air preheater.

In Vol. 113 Journal of Engineering for Gas Turbines and Power, "Cogenerative, Direct Exhaust Integration of Gas Turbines in Ethylene Production" by Cooke et al., pp. 212–220 (1991) direct integration options are disclosed in which ethylene cracking furnace combustion air is either completely or partially replaced with gas turbine exhaust. As pointed out in this paper, there has to be some means to divert exhaust gas during periods of lower furnace demand for oxygen and colder seasons in which the air is denser and hence, more oxygen is present. If this were not done, then the gas turbine would have to be operated at continuously varying loads, significantly less then full loads. This would lead to an unacceptable variable electrical output of a generator powered by the gas turbine. On the other hand, it would be a waste of fuel to simply divert part of the gas turbine exhaust and not recover its heating value. In order to solve this problem, a flywheel boiler is used that is capable of producing medium to low pressure steam from the excess exhaust. The use of such an economizer adds to the costs of the integration.

Stone & Webster Engineering Corporation, "Gas Turbine Integration to Reduce Costs," by Shallice (1985) describes options for integrating gas turbine into a petrochemical complex. Either combustion air is fully replaced with gas turbine exhaust, or partially replaced in which case gas turbine exhaust is mixed with ambient air. The same problems regarding the use of excess turbine exhaust are present in this reference.

In U.S. Pat. No. 6,200,128, a method is disclosed in which oxygen and gas turbine exhaust is fed into a boiler. The use of oxygen, however, adds to the expenses involved in such an integration.

As will be discussed, the present invention provides a method and a system in which a gas turbine can be practically integrated with a fluid heater such as a steam methane reformer or a fired furnace without any modification of the fluid heater or oxygen addition, but with reduced fuel consumption.

SUMMARY OF THE INVENTION

The present invention provides a method of heating a fluid in a fluid heating device that is integrated with a gas turbine. In accordance with the present invention, the fluid to be heated is introduced into the fluid heating device. The fluid heating device is provided with a radiant section, at least one convective section and passages for the fluid extending through at least the radiant section. An oxygen containing stream or a combined oxidant stream, made up in part by the oxygen containing stream, is preheated through indirect heat transfer with a first gas turbine exhaust stream produced by the gas turbine. A second gas turbine exhaust stream, also produced by the gas turbine, is combined with the oxygen containing stream to form the combined oxidant stream. At least one fuel stream and the combined oxidant stream are introduced into the radiant section of the fluid heating device and the fuel is burned to heat the fluid and to produce hot combustion gases flowing to the at least one convective section.

As may be appreciated, the preheated oxygen containing stream and the second gas turbine exhaust stream need not be combined prior to their introduction to the fluid heating device. Hence, the present invention also comprehends, preheating the oxygen containing stream through indirect heat transfer with the first gas turbine exhaust stream produced by the gas turbine. The at least one fuel stream and the oxygen containing stream after having been preheated and a second gas turbine exhaust stream produced by the gas turbine, either separately or combined with one another as a combined stream, are introduced into the radiant section of the fluid heating device Since there is no need to divert major exhaust flows from the gas turbine the integration of the present invention eliminates the additional capital expenditures associated with economical heat recovery. Additionally, since the heat exchange is split between direct heat exchange of second gas turbine exhaust stream and the indirect heat exchange of the first gas turbine exhaust stream, the preheater does not have to be designed to capture all of the available heat energy from the gas turbine exhaust stream. As such, the preheater can be made smaller and less expensively than prior art integrations that solely involve heat exchange between the incoming air and the gas turbine exhaust. Further, being that the oxygen concentration versus the heat provided by the second gas turbine exhaust stream can be finely adjusted, there is no need for supplemental oxygen and the like.

By using a portion of gas turbine exhaust to preheat the oxygen containing gas and another portion to mix with the oxygen containing gas after having been preheated, the fluid heating device can be operated such that the heat absorbed in the radiant and convective sections, flue gas flow rate at the induced draft fan inlet remain at the same level as when operating on air alone to conserve fuel. In this aspect the present invention, a flow rate ratio between the oxygen containing stream and the second gas turbine exhaust stream can be selected and the fuel flow rate of the at least one fuel stream can be sufficiently reduced such that radiant heat transfer within the radiant heat transfer section and convective heat transfer within the at least one convective heat transfer section are about equal to those that would otherwise have been produced had the oxygen containing stream alone been used to support the combustion.

Thus, the present invention can be applied to the direct reduction of the amount of fuel required by the fluid heating device. As may be appreciated, fuel flow rates may be increased so that radiant heat transfer and convective heat transfer is increased so as to also allow for an increased plant throughput. The present invention adds flexibility to the approach to increase fluid heating and plant throughput by have the option of adjusting the oxygen content of the combustion gas when the fuel flow rate is increased.

In case the oxygen containing stream is preheated through the indirect heat transfer with the first gas turbine exhaust stream. A main gas turbine exhaust stream can be divided into the first gas turbine exhaust stream and the second gas turbine exhaust stream prior to the preheating of the oxygen containing stream with the first gas turbine exhaust stream. The second gas turbine exhaust stream can be produced from the first gas turbine exhaust stream, after the preheating of the oxygen containing stream, by dividing the first gas turbine exhaust stream into the second gas turbine exhaust stream and a remaining portion of the first gas turbine exhaust stream.

The combined oxidant stream can be preheated through indirect heat transfer with the first gas turbine exhaust stream. The first gas turbine exhaust stream can be divided into the second gas turbine exhaust stream and a remaining portion of the first gas turbine exhaust stream subsequent to the preheating of the combined oxidant stream. The second gas turbine exhaust stream can be combined with the oxygen containing stream subsequent to passage of the oxygen containing stream through a forced draft fan to form the combined oxidant stream prior to the preheating of the combined oxidant stream. Alternatively, the combined oxidant stream can be introduced into the forced draft fan and then preheated by the indirect heat exchange with the first gas turbine exhaust stream.

In case the oxygen containing stream is preheated through the heat transfer with the first gas turbine exhaust stream, a main gas turbine exhaust stream can be divided into the second gas turbine exhaust stream and a remaining portion of the main gas turbine exhaust stream. The remaining portion of the main gas turbine exhaust stream can be divided into the first gas turbine exhaust stream and a third gas turbine exhaust stream. The third gas turbine exhaust stream can be introduced into the at least one convective section.

In an embodiment of the present invention in which the main gas turbine exhaust stream is divided into the first and second gas turbine exhaust stream prior to the preheating of the oxygen containing stream with the first gas turbine exhaust stream, steam can be superheated through indirect heat transfer between the main gas turbine exhaust stream. This heat transfer thus can occur prior to dividing the main gas turbine exhaust stream into the first and second gas turbine exhaust stream. Additionally, steam may be superheated through indirect heat transfer between the first gas turbine exhaust stream and the steam prior to the preheating of the oxygen containing stream with the first gas turbine exhaust stream. In such case, the heat transfer occurs subsequent to the division of the main gas turbine exhaust stream.

In yet another embodiment in which the oxygen containing stream is preheated through the indirect heat transfer with the first gas turbine exhaust stream, the oxygen containing stream is heated prior to having been preheated in the at least one convective section. A main gas turbine exhaust stream can be divided into the first gas turbine exhaust stream and the second gas turbine exhaust stream prior to the heat transfer between the oxygen containing stream and the first gas turbine exhaust stream.

Where the fluid heater is a steam methane reformer, the fluid passages can contain catalyst. Steam and a methane containing reactant are feed into the fluid passages as the fluid to produce a synthesis gas. The at least one fuel stream can be a hydrocarbon containing stream and a PSA tail gas stream.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
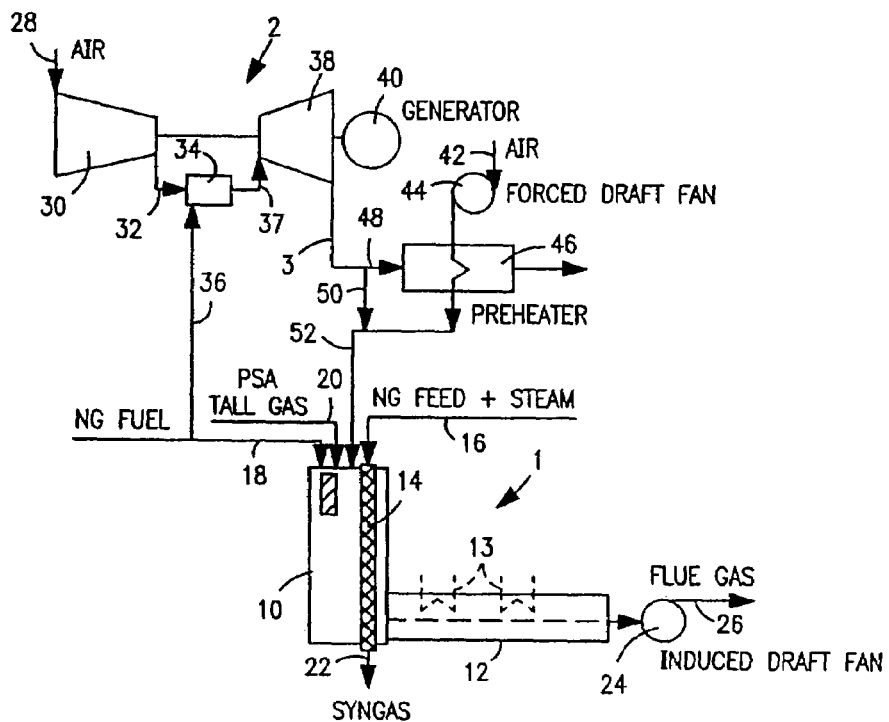
FIG. 1 is a schematic process flow diagram of an integrated gas turbine and steam methane reformer in accordance with the present invention.

In order to avoid needless repetition in the explanation of the figures, the same reference numbers are used in the various figures to designate elements having the same function.

With reference to the Figures, an integration is disclosed in which a fluid is heated in a fluid heating device, which for purposes of illustration is a steam methane reformer 1 integrated with a gas turbine 2 that produces a main gas turbine exhaust stream 3. Steam methane reformer 1 is provided with a radiant section 10 and a convective section 12. Convective section 12 is provided with heat exchange passes 13 to recover the heat energy from the hot combustion gases produced in the radiant section 10. It is understood that the present invention has application to like devices with radiant and convective sections such as other types of fired furnaces, reactors, boilers, process fluid heaters and the like.

Radiant section 10 of steam methane reformer 1 is provided with catalyst tubes 14 which serve as fluid passages for a fluid which consists of a feed 16 that contains natural gas and steam. In other types of fluid heating devices, passages for a working fluid can extend into the convective section. Catalyst tubes 14 are heated by combustion of a fuel stream 18 introduced into radiant section 10 and a PSA tail gas stream 20. The radiant heat generated applies heat to support the endothermic steam methane reforming process occurring within catalyst tubes 14 to produce a synthesis gas stream 22. Synthesis gas stream 22 can be sent to a separation unit such as a pressure swing adsorption unit, to separate out hydrogen. The resultant tail gas which consists of the hydrogen that has not been separated, carbon monoxide and unreacted natural gas is used to form the PSA tail gas stream 20.

The hot combustion gases produced by the aforementioned combustion flow through the convective section 12 in which flow of combustion products from radiant section 10 is induced by an induced draft fan 24 to produce a flue gas stream 26.

As stated previously, main gas turbine exhaust stream 3 is produced by a gas turbine 2 in which an incoming air stream 28 is compressed in a compressor section 30. The compressed air as a compressed stream 32 is then introduced into a burner 34 in which the compressed air stream 32 is used to support combustion of a fuel stream 36 which may be formed in part from natural gas fuel stream 18. It is understood that the fuel fed to the gas turbine 2 could have a different composition than the fuel fed to the fluid heating 1. The resultant combustion stream 37 is introduced into a turbine section 38 that is used to power a load 40 which can be an electrical generator. This produces a gas turbine exhaust that can be used in its entirety or in part to form main gas turbine exhaust stream 3.

An incoming oxygen containing stream 42, which can be air, is introduced into a forced draft fan 44 and into a preheater 46. Preheater 46 can be recuperative or regenerative using standard materials of construction. Main gas turbine exhaust stream 3 is divided into first gas turbine exhaust stream 48 and a second gas turbine exhaust stream 50. First gas turbine exhaust stream 48 is introduced into the preheater 46 for transferring heat to the oxygen containing stream 42. Second gas turbine exhaust stream 50 is combined with the oxygen containing stream 42, after having been heated, to produce a combined stream 52 that is used to support the combustion of natural gas fuel stream 18 and PSA tail gas stream 20. As indicated above, oxygen containing stream 42 and second gas turbine exhaust stream 50 in this and other embodiments herein could be separately introduced into radiant section 10 of stem methane reformer 1.

The integration illustrated in FIG. 1 was simulated and compared with prior art integrations. Each case assumed a commercially available 10.7 MW gas turbine ("GT") and a steam methane reformer ("SMR") producing 7,000,000 scf/day of hydrogen.

TABLE 1

Process Simulation Results Case

| | | 1 | 2 | 3 | 4 |
|---|---|---|---|---|---|
| | | | Case Description | | |
| | | Non-Integrated SMR & Gas Turbine | GT Exhaust & O2 mixed with Ambient Air (Prior Art) | GT Exhaust/Ambient Air Htr (Prior Art) | GT Exhaust/Ambient Air Htr & GT Exh + Heated Air (FIG. 1) |
| H2 Make from SMR | MMSCFD | 7.0 | 7.0 | 7.0 | 7.0 |
| GT Net Output | MW | 10.7 | 10.7 | 10.7 | 10.7 |
| Ambient Air to SMR | Klb/h | 558 | 262 | 559 | 415 |
| GT Exhaust to SMR | Klb/h | N/A | 287 | 0 | 140 |
| GT Exhaust to Air Preheater | Klbh | N/A | N/A | 287 | 147 |
| GT Exhaust T @ SMR/Air Heater Inlet | F | N/A | 1091 | 1091 | 1091 |
| Heated Air T @ Air Heater Outlet | F | N/A | N/A | 567 | 402 |
| O2 to SMR | Ton/day contained O2 | N/A | 109 | 0 | 0 |
| Oxidant* Flow @ SMR Inlet | Klb/h | 558 | 559 | 559 | 555 |
| Oxidant* T @ SMR Inlet | F | 90 | 627 | 567 | 590 |
| SMR Flue gas Flow | Klbmole/h | 23.7 | 23.5 | 23.5 | 23.5 |
| SMR Flue gas 02 Content | Mole % | 1.6 | 1.6 | 3.5 | 1.6 |
| SMR Flue gas T @ ID Fan Inlet | F | 298 | 291 | 291 | 291 |
| SMR Flue gas flow @ ID Fan Inlet | kacfm | 225 | 222 | 222 | 222 |
| Air Heater Duty | MMBtu/h | N/A | N/A | 67 | 32 |
| Air Heater UA** | MMBtu/h/F | N/A | N/A | 1.1 | 0.1 |

TABLE 1-continued

Process Simulation Results Case

| | | 1 | 2 | 3 | 4 |
|---|---|---|---|---|---|
| | | | | Case Description | |
| | | Non-Integrated SMR & Gas Turbine | GT Exhaust & O2 mixed with Ambient Air (Prior Art) | GT Exhaust/Ambient Air Htr (Prior Art) | GT Exhaust/Ambient Air Htr & GT Exh + Heated Air (FIG. 1) |
| NG to SMR | | | | | |
| Feed | kscfh | 1058 | 1058 | 1058 | 1058 |
| Fuel | kscfh | 352 | 257 | 266 | 266 |
| Total Feed + Fuel | kscfh | 1410 | 1315 | 1324 | 1324 |
| NG to GT | kscfh | 131 | 131 | 131 | 131 |
| Total NG to SMR & GT | kscfh | 1541 | 1446 | 1455 | 1455 |
| Export Steam from SMR | klb/h | 235 | 230 | 229 | 232 |

*Oxidant = (Ambient Air) or (Ambient Air + GT Exhaust +O2) or (Ambient Air + GT Exhaust) or (Heated Air + Portion of GT Exhaust)
**UA = (overall heat transfer coefficient)* (Area)

Case 1 is a nonintegrated system and as expected consumes the most natural gas, that is total natural gas to the gas turbine and the steam methane reformer. Cases 2, 3 and 4 simulate integration approaches that maintain the steam methane reformer hydrogen and exports steam production at about the same levels as case 1. Additionally, these cases maintain the flue gas flow and temperature at the induced draft fan 24 at practically the same level as case 1 but consume less natural gas than case 1.

Case 2 is the prior art approach that additionally maintains oxygen in stack gas at the same level as case 1 by replacing a portion of the combustion air with gas turbine exhaust and oxygen. As mentioned above, oxygen however, increases production costs. Case 3 is the prior art approach where all the gas turbine exhaust preheats the combustion air needed by the steam methane reformer. There is no supplemental firing or ambient air into the steam methane reformer convective section and no oxygen or gas turbine exhaust is introduced into the steam methane reformer. Because of the steam methane reformer combustion air preheat, less fuel is required to produce the same amount of hydrogen and export steam which means oxygen in the stack is higher than in other cases, and potentially could have higher NOx emissions. This is a major disadvantage with this type of integration.

Case 4 is the integration illustrated in FIG. 1. Case 4 consumes less natural gas than the nonintegrated case 1. No oxygen is needed as compared with case 2. In case 4, there is less potential for the production of NOx and in addition, less capital expenditures are required in that the preheater 46 is significantly smaller than the preheater that would be required for case 3. In case 4, the carbon dioxide and water in the gas turbine exhaust 3 introduced into the steam methane reformer will help reduce NOx emissions.

In case 4, or for that matter any of the other embodiments set forth hereinafter, a flow rate ratio between the oxygen containing stream and the second gas turbine exhaust stream (in FIG. 1, oxygen containing stream 42 and second gas turbine exhaust stream 50) is set and the fuel flow rate of fuel stream 18 such that radiant heat transfer within the radiant heat transfer section 10 and convective heat transfer within the at least one convective heat transfer section 12 are about equal to those that would otherwise have been produced had the oxygen containing stream alone been used to support the combustion of the fuel. It is to be noted that it is equally possible to additionally or in the alternative adjust PSA tail gas stream 20 if there were some downstream use of the same. Further, if there were a use for the PSA tail gas stream 20, it might not be recycled and further, in other types of fluid heating devices such as boilers, there would be no PSA tail gas stream available to supplement the fuel. In case 4, this ratio is 414/140 and the fuel flow of fuel stream 18 is reduced by 90 kscfh. The ratio and the degree to which the fuel flow can be reduced is computed by developing an energy balance around the fluid heater that considers the fluids entering and leaving the fluid heater and the combustion occurring therein prior implementing the invention and comparing that to the energy balance that would result from employing the invention. Alternatively, by the same computational technique, fuel flow can be increased and the flow of second subsidiary stream 50 could be adjusted downward for increased plant throughput without changing the flow through the induced draft fan. If both ID fan and FD fan have extra capacity, both streams 50 and 42 can be increased in flow to support the combustion of additional fuel and increase plant output.

As can be appreciated, such an integration as contemplated by the present invention can be executed in a new steam methane reformer installation or as a retrofit to an existing steam methane reformer installation. The aforesaid statement would apply to any fluid heater, whether new or as a retrofit. In FIG. 1 you would likely control the split between stream 48 and 50 by using a damper on the first exhaust gas stream as it leaves unit 46. The rate of streams 42 and 50 will be determined by the heat duty requirements of the heater, i.e., the temperature of the syngas leaving tube 14, the oxygen content in stream 46 and the amount of fuel fed. The flows would be limited by the capacity of the FD and ID fans. The existing control system for reformer could be slightly modified to carry out the foregoing control objects.

Figure 2:
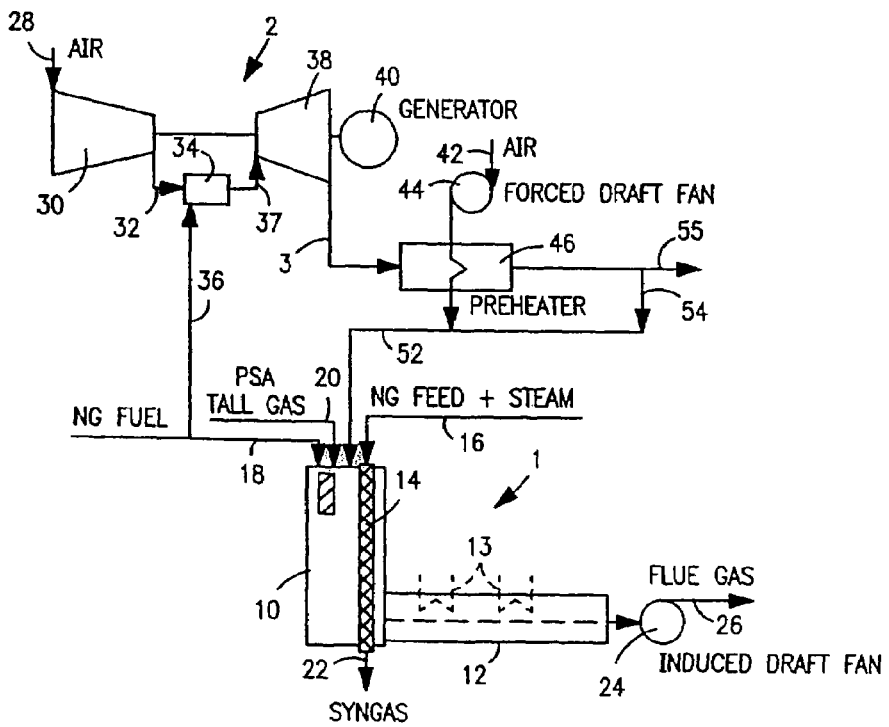
FIG. 2 is an alternative embodiment of FIG. 1.

With reference to FIG. 2, the main gas turbine exhaust stream 3 serves as a first gas turbine exhaust stream, which after preheater 46, is divided into a second gas turbine exhaust stream 54 and a remaining portion of the first gas turbine exhaust stream indicated by reference number 55. Second gas turbine exhaust stream 54 is combined with oxygen containing stream 42 to produce combined stream 52. As may be appreciated, combined stream 52 could be cooler than combined stream 52 in FIG. 1 for a given preheater surface area. The foregoing type of integration could be used when the flow rate of stream 42 is large relative to the gas turbine exhaust stream 3.

Figure 3:
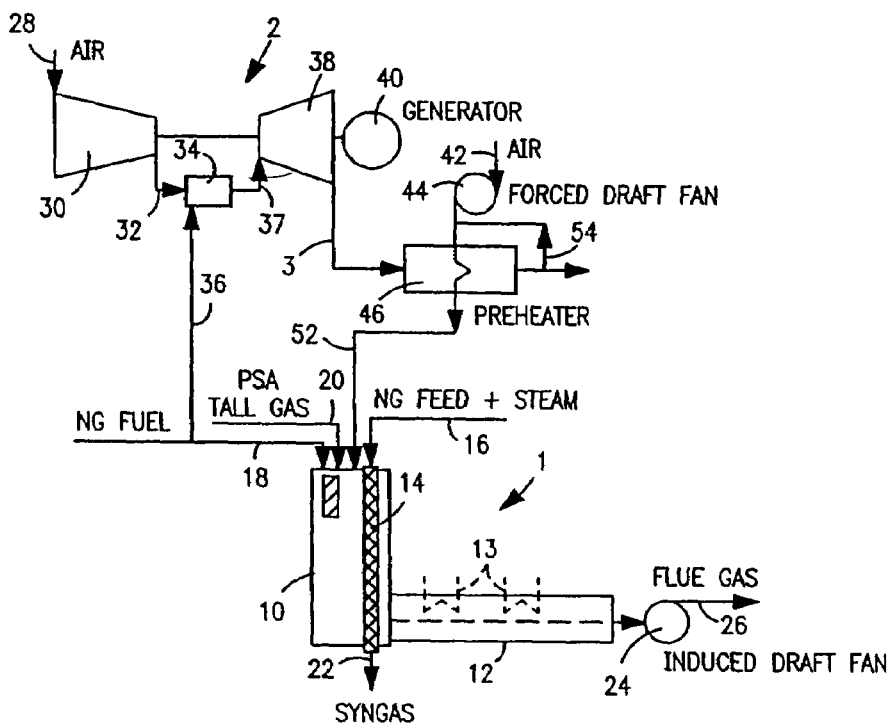
FIG. 3 is an alternative embodiment of FIG. 1.
Figure 4:
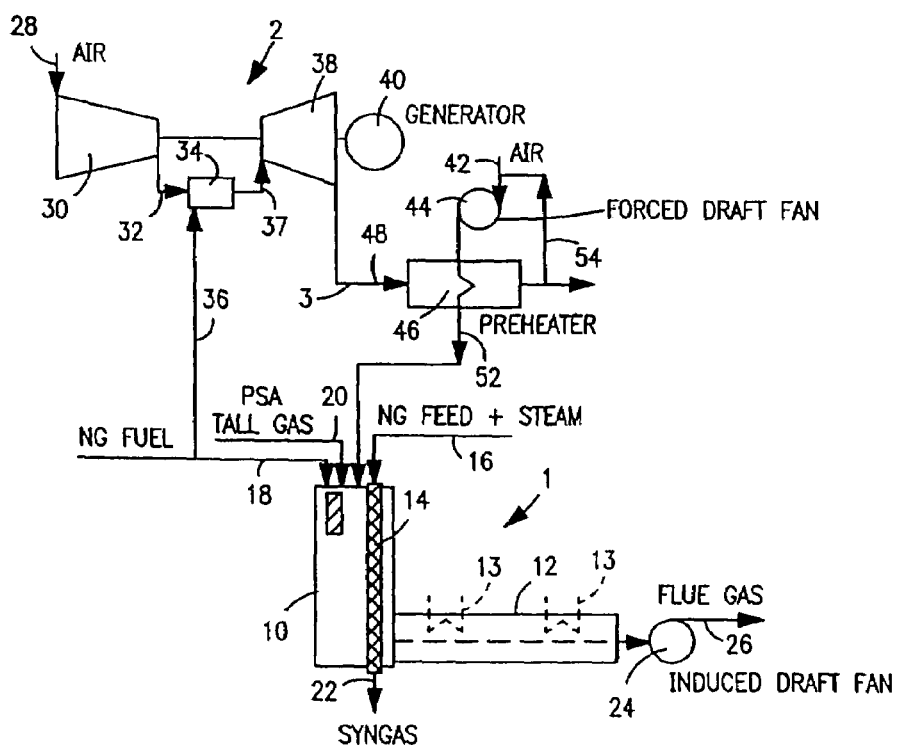
FIG. 4 is an alternative embodiment of FIG. 1.

With reference to FIG. 3, if second gas turbine exhaust stream 54 exits preheater 46 with sufficient pressure, it can be combined with oxygen containing stream 42 prior to preheater 46 but after forced draft fan 42. With reference to FIG. 4, the combination of second gas turbine exhaust stream 54 and oxygen containing stream 42 occurs prior to forced draft fan 44. Such embodiment would be useful where there were excessive pressure drop within preheater 46. This will help maximize gas turbine output since no back-pressure device will be needed to control the flows of the first and second gas turbine exhaust streams.

Figure 5:
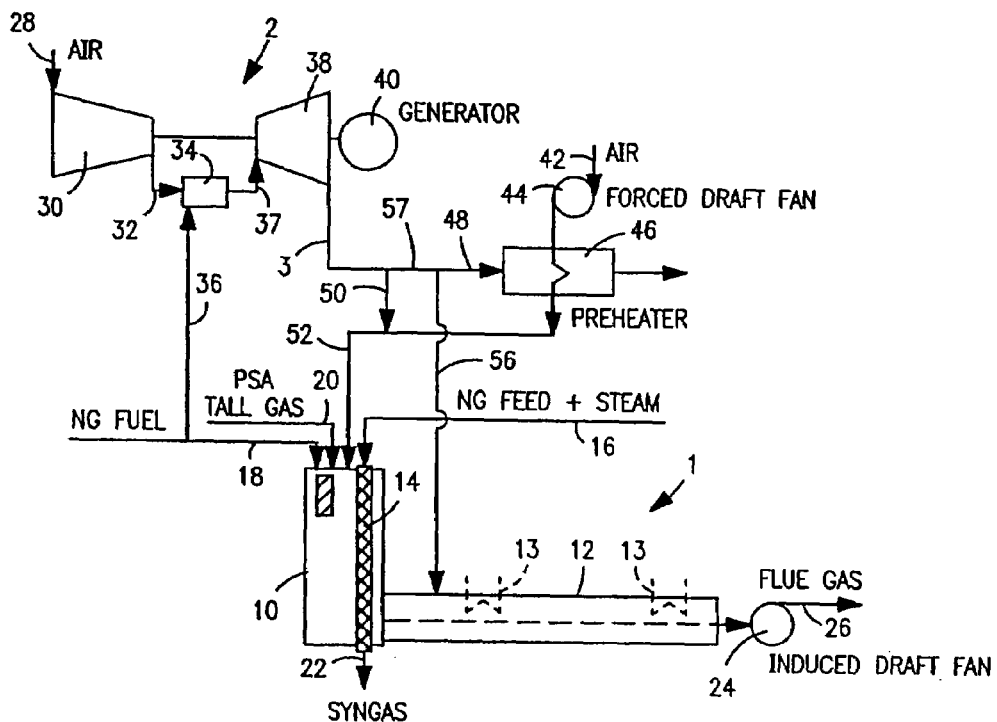
FIG. 5 is an alternative embodiment of FIG. 1 in which part of the gas turbine exhaust also serves to heat the convective section.

With reference to FIG. 5, main gas turbine exhaust stream 3 is divided into second gas turbine exhaust stream 50 and a remaining portion 51 of the main gas turbine exhaust stream 3. Remaining portion 51 of the main gas turbine exhaust stream 3 is then divided into first gas turbine exhaust stream 48 and fed into preheater 46 and a third gas turbine exhaust stream 56. Third gas turbine exhaust stream 56 is introduced into convective section 12 for recovery of part of the heat within convection section 12. This embodiment allows for additional heat recovery if stream 51 is significantly larger than stream 42.

Figure 6:
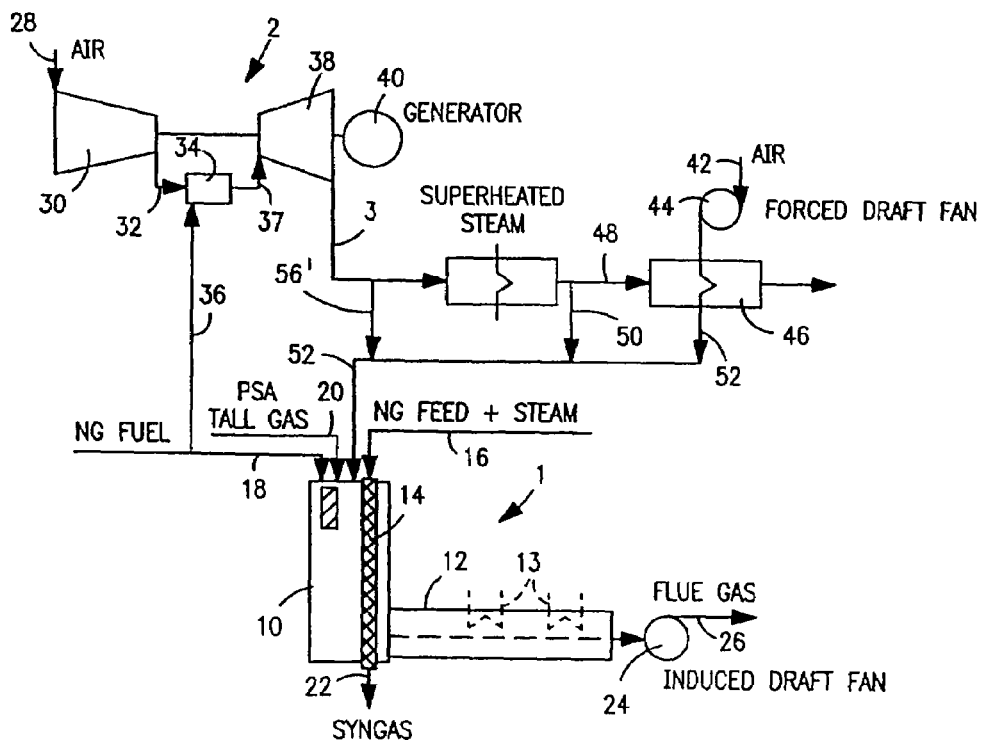
FIG. 6 is an alternative embodiment of FIG. 1 in which a gas turbine exhaust is used to superheated steam.

With reference to FIG. 6, the main gas turbine exhaust stream 3 passes through a steam superheater 58 prior to its division into the first gas turbine exhaust stream 48 and the second gas turbine exhaust stream 50. Optionally, a third gas turbine exhaust stream 56' can be divided out of the main gas turbine exhaust stream 3 prior to steam superheater 58 to increase the temperature and mass of combined stream 52. Another possibility with respect to such foregoing option is to delete second gas turbine exhaust stream 50 and use third gas turbine exhaust stream 56' as the second gas turbine exhaust stream. In such case, the first gas turbine exhaust stream 48 supplied heat to steam superheater 58 and preheater 46.

Figure 7:
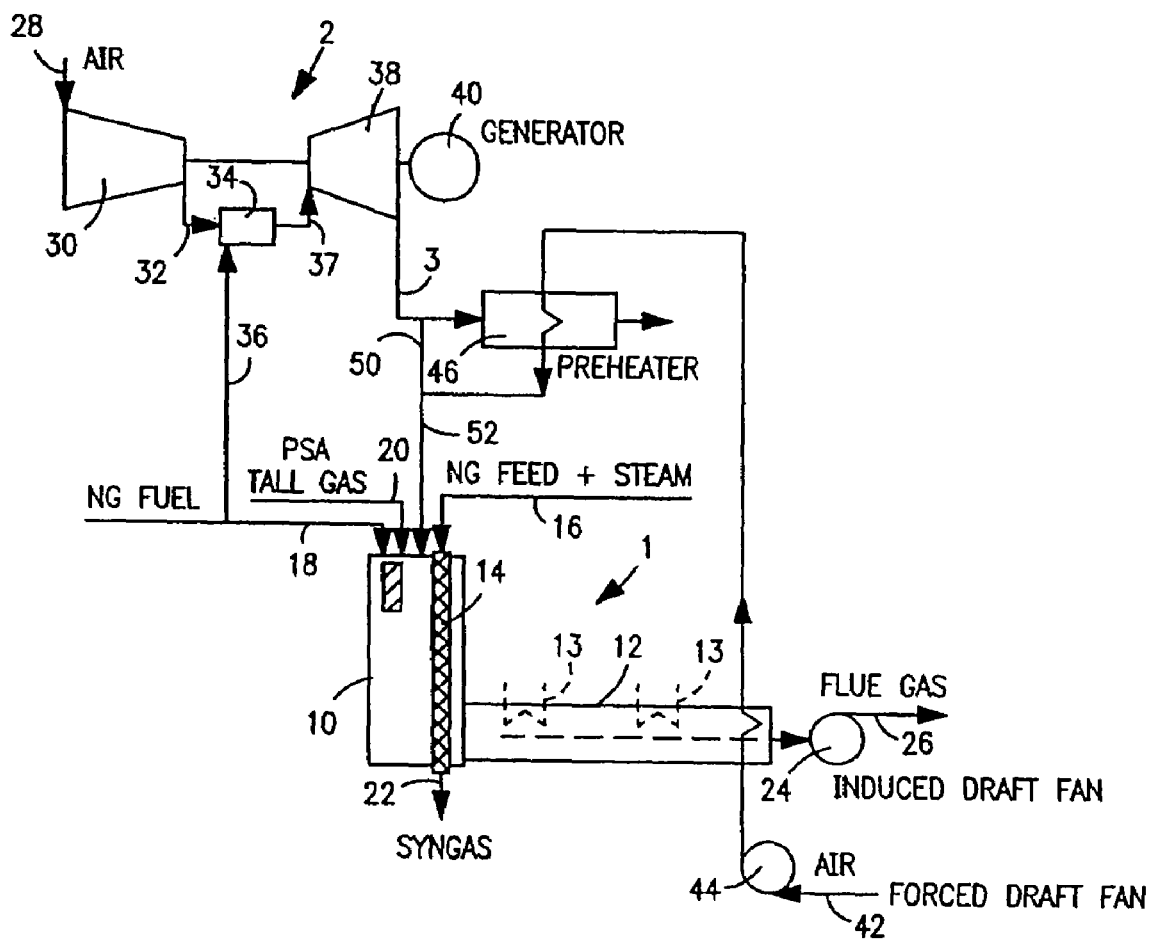
FIG. 7 is an alternative embodiment of FIG. 1 in which the incoming air stream is also preheated in the convective section of the steam methane reformer.

With reference to FIG. 7, incoming oxygen containing stream 42 is initially preheated in convection section 12 prior to being finally preheated in preheater 46. As may be appreciated, this embodiment allows the same amount of heat as any of the previous embodiments with a smaller and therefore less expensive preheater.

While the present invention has been described with reference to preferred embodiments, as will be understood by those skilled in the art, numerous changes, omissions and additions can be made without departing from the spirit and the scope of the present invention.

We claim:

1. A method of heating a fluid in a fluid heating device integrated with a gas turbine, said method comprising:
    introducing the fluid into the fluid heating device having a radiant section, at least one convective section and passages for the fluid extending through at least the radiant section;
    preheating an oxygen containing stream through indirect heat transfer with a first gas turbine exhaust stream produced by the gas turbine;
    the first gas turbine exhaust stream being formed by dividing the first gas turbine exhaust stream from at least part of a main gas turbine exhaust stream produced by the gas turbine;
    superheating steam with the at least part of the main gas turbine exhaust stream; and
    introducing at least one fuel stream and the oxygen containing stream after having been preheated and a second gas turbine exhaust stream produced by the gas turbine, either separately or combined with one another as a combined stream; into the radiant section of the fluid heating device and burning the fuel to produce hot combustion gases that exit the radiant section and flow to the at least one convective section.

2. The method of claim 1, wherein the at least part of the main gas turbine exhaust stream is divided into the first gas turbine exhaust stream and the second gas turbine exhaust stream, the division occurring subsequent to the superheating of the steam.

3. The method of claim 2, further comprising:
    dividing a third gas turbine exhaust stream from the main gas turbine exhaust stream so that a remaining part of the main gas turbine exhaust stream superheats the steam and then is divided into the first gas turbine exhaust stream and the second gas turbine exhaust stream; and
    the third gas turbine exhaust stream is introduced into the radiant section of the fluid heating device either separately or combined with the first gas turbine exhaust stream, the second gas turbine exhaust stream and the third gas turbine exhaust stream.

4. The method of claim 1 wherein:
    the fluid heating device is a steam methane reformer;
    the fluid passages contain catalyst; and
    steam and a methane containing reactant are fed into the fluid passages as the fluid to produce a synthesis gas.

5. The method of claim 1, wherein the at least one fuel stream is a hydrocarbon containing stream and a PSA tail gas stream.

* * * * *